Patented May 1, 1951

2,550,706

UNITED STATES PATENT OFFICE 2,550,706

MODIFIED ALKYD RESINS FROM 4-CYCLO-HEXENE - 1,2 - DICARBOXYLIC ACID AND PROCESS FOR PRODUCING SAME

George D. Martin, Upper Darby, Pa., assignor to Publicker Industries Inc., Philadelphia, Pa., a corporation of Pennsylvania No Drawing. Application October 12, 1946, Serial No. 702,885

1 Claim. (Cl. 260—22)

The present invention relates to modified alkyd resins and more particularly to modified alkyd resins of 4 - cyclohexene - 1,2 - dicarboxylic acid which possess rubber-like properties. An object of the present invention is to provide new and useful modified alkyd resins of 4-cyclohexene-1,2-dicarboxylic acid and to processes for producing same.

Other objects and advantages of the present invention are apparent in the following detailed description and appended claims.

Alkyd resins modified with castor oil, ricinoleic acid and the like have been known in the art for many years. For example, Bradley 1,863,264 discloses that a "hard" resin is obtained by reacting phthalic anhydride, glycerol and castor oil together at 290° C., a result which I have checked experimentally.

I have now found that, quite unexpectedly, when 4-cyclohexene-1,2-dicarboxylic acid was substituted for phthalic acid an entirely different type of resin was obtained—that is, quite unpredictably, the resin obtained was soft and rubber-like.

According to the present invention, it is possible to obtain new and useful resins, all having, as a distinguishing property, a rubber-like nature, by reacting 4-cyclohexene-1,2-dicarboxylic acid or anhydride with an appropriate polyhydric alcohol and a suitable modifying agent.

Among the polyhydric alcohols which can be used accordingly to the present invention are: glycols, such as ethylene, propylene, and butylene glycols; polyethylene glycol, thiodiglycols; dihydroxycyclohexane; glycerol, or its homologs or polymers; tetrahydric alcohols, such as erythritol, pentaerythritol, etc.; poly-pentaerythritols; sorbitol and mannitol; dimethylol urea; diethanolamine; triethanolamine; polyhydric alcohols containing ester or ether groups, such as glycerol monobutyl ether, glycerol monooctyl ether, glycerol monoacetate, etc. Combinations of two or more of these alcohols may also be employed.

Modifying agents contemplated for use in this invention are: castor oil and similar non-drying oils, hydroxy oils, hydroxy unsaturated oils, etc.; ricinoleic acid and similar hydroxy acids, hydroxy unsaturated acids, etc.; soy bean oil; soy bean fatty acids, etc.; in general, such hydroxy oils and fatty acids and their equivalents as will give a rubber-like resin when reacted with 4-cyclohexene-1,2-dicarboxylic acid and an appropriate polyhydric alcohol.

The rubber-like resins of the present invention may be prepared by reacting 4-cyclohexene-1,2-dicarboxylic acid or anhydride together with one or more polyhydric alcohols and one or more suitable modifying agents to eliminate water and form the desired resin. The reactants may be reacted together all at the same time, or they may be reacted in any other possible order to obtain the desired resin. Dehydration catalysts such as hydrochloric acid, phosphoric acid, zinc chloride, lead oxide, etc. may be used to promote the reaction, but in general these are not necessary. The reaction may be carried out at any suitable temperature and pressure. Temperatures from about 100° C. to about 300° C. and atmospheric pressures are generally suitable. Higher temperatures and/or lower pressure give shorter reaction times. The pressure may range from 10 mm. or less to 5 atmospheres or more. These reaction times may extend from a few minutes to several days.

The reaction may also be carried out in an inert atmosphere, such as nitrogen, etc.; or in a solvent, such as xylene, suitable for the continuous removal of water. The color of the resin may be improved by this modification.

The nature of the product may be varied by the extent of the condensation or polymerization. The product which is at first soft and tacky appears to reach its maximum rubber-like nature near the point of gelation, and thereafter to become hard and granular.

A wide number of uses suggest themselves for these novel resins. Some of these are: bonding agent for wood, glass, rubber, etc.; tackifier and softening agent for synthetic rubbers, resins, etc.; coating, and impregnating agent, as for wood, metal textiles, etc.; additive to nitrocellulose, synthetic resins, etc. to improve toughness, flexibility, adhesion, etc.; in water paints; and in rubber latices to improve toughness, flexibility, tack, etc.

The following examples may serve to illustrate the preparation and properties of certain members of our preferred class of compounds, it being understood that this invention is not limited to these specific examples. The parts are by weight.

*Example 1*

76 parts of 4-cyclohexene-1,2-dicarboxylic anhydride, 31 parts of glycerine, and 75 parts of castor oil were heated together with stirring for about 4 hrs. at 190–200° C. and until a gelatinous mass formed which was tough and rubber-like on cooling. It could be stretched into thin films with considerable nerve and tensile strength. It was very tacky and did not seem to change in properties after 8 months exposure to air. A sample of the product was cured with sulfur mono-chloride to a hard crumbly condition.

*Example 2*

76 parts 4-cyclohexene-1,2-dicarboxylic anhydride, 31 parts of glycerine, and 60 parts of castor oil were heated together with stirring at approximately 200° C. for 4 hrs. The reaction was stopped just before gelation occurred, as indicated by a standard gelation test. The cold product had essentially the same properties as that in Example 1 except that it was slightly less tacky.

*Example 3*

76 parts of 4-cyclohexene-1,2-dicarboxylic anhydride, 31 parts of glycerine, and 85 parts of castor oil were heated together with stirring for about 4 hrs. at 200° C. The product closely resembled that of Examples 1 and 2 except that it was more tacky than either of these.

*Example 4*

15 parts of castor oil, 28 parts glycerine, and about 0.3 part of soda ash were heated together with stirring at 170–180° C. until the mixture was compatible. 15 parts of ricinoleic acid and 44 parts of 4-cyclohexene-1,2-dicarboxylic anhydride were then added and the temperature slowly raised to 245° C. and held there for about 15 min. A clear soft tacky resin was obtained. This could be made rubber-like by further heating.

*Example 5*

76 parts of 4-cyclohexene-1,2-dicarboxylic anhydride, 38.4 parts of glycerine, and 76 parts of ricinoleic acid were heated together with stirring for about three hrs. at 200° C., and until the product began to gel. It was then scraped out of the flask and found to be rubber-like and very similar to the products in Examples 1, 2, and 3.

*Example 6*

608 parts of 4-cyclohexene-1,2-dicarboxylic anhydride, 600 parts of castor oil, and 248 parts of glycerine were heated on a heater with stirring and under a water aspirator vacuum at approximately 200° C. for two hours. This was considerably before the gelation point and the resin obtained was soft and tacky. An emulsion containing 50% solids may be prepared by the addition of small amounts of ammonium hydroxide or ethanolamines as emulsifying agents.

*Example 7*

25 parts of 4-cyclohexene-1,2-dicarboxylic acid, 24 parts of dihydroxystearic acid, and 13 parts of glycerine were heated together at approximately 200° C. for 2½ hours and until gelation was almost reached. The product obtained was rubber-like and resembled the castor oil resins described in Examples 1, 2, 3, etc.

*Example 8*

19 parts of 4-cyclohexene-1,2-dicarboxylic acid, 10 parts of glycerine, and 17.5 parts of dihydroxylated linoleic acid obtained by oxidizing sodium linoleate with potassium permanganate were heated together at 180–200° C. under a moderate vacuum until gelation occurred. The product was tacky and appeared even more rubber-like than the castor oil resins described in the above examples.

The present invention may be embodied in other specific forms without departing from the spirit or essential attributes thereof, and it is therefore desired that the present embodiments be considered in all respects as illustrative and not restrictive, reference being had to the appended claim rather than to the foregoing description to indicate the scope of the invention.

Having thus described my invention, I claim as new and desire to protect by Letters Patent:

A process for forming a synthetic resin having rubber-like properties near its gelation point which includes the step of heating together about 608 parts of 4-cyclohexene-1,2-dicarboxylic acid, 600 parts of castor oil and 248 parts of glycerine with stirring under moderate vacuum at about 200° C. for about 2 hours.

GEORGE D. MARTIN.

REFERENCES CITED

The following references are of record in the file of this patent:

UNITED STATES PATENTS

| Number | Name | Date |
|---|---|---|
| 1,098,728 | Howell | June 2, 1914 |
| 1,860,730 | Brooks et al. | May 31, 1932 |
| 2,251,297 | Soday | Aug. 5, 1941 |
| 2,385,776 | Daniels | Oct. 2, 1945 |